United States Patent [19]

Martin

[11] 4,009,979

[45] Mar. 1, 1977

[54] MOLDING DIE APPARATUS

[75] Inventor: Roger G. Martin, Greenville, Mich.

[73] Assignee: Master Unit Die Products, Inc., Greenville, Mich.

[22] Filed: June 26, 1974

[21] Appl. No.: 483,238

[52] U.S. Cl. .............................. 425/107; 249/68; 425/242 R; 425/444

[51] Int. Cl.² .......................................... B29F 1/14

[58] Field of Search .................. 249/66, 67, 68; 425/444, 107, DIG. 232, DIG. 51, DIG. 115, 242 R, 247; 264/328, 329

[56] References Cited

UNITED STATES PATENTS

| | | | |
|---|---|---|---|
| 2,587,070 | 2/1952 | Spillman | 249/68 X |
| 3,044,121 | 7/1962 | Wiskoff et al. | 249/68 |
| 3,270,383 | 9/1966 | Hall et al. | 425/444 X |
| 3,687,591 | 8/1972 | Perego | 425/444 X |
| 3,695,572 | 10/1972 | Jullien-Davin | 249/68 |
| 3,794,286 | 2/1974 | Jullien-Davin | 425/444 X |
| 3,841,823 | 10/1974 | Hehl | 425/107 X |
| 3,899,282 | 8/1975 | Jesse | 425/444 |

Primary Examiner—Ronald J. Shore
Assistant Examiner—Mark Rosenbaum
Attorney, Agent, or Firm—McGarry & Waters

[57] ABSTRACT

A die frame assembly wherein an ejector plate having ejector pins extending therefrom is reciprocally mounted on support posts in the frame assembly through replaceable and lubricated bushings on the ejector plate. The support posts extend between the base or clamping plate and the central sprue section of the frame for rigid support thereof. The support posts are desirably hardened or case-hardened for long wearing.

9 Claims, 3 Drawing Figures

MOLDING DIE APPARATUS

BACKGROUND OF THE INVENTION

1. Field of the Invention

This invention relates to molding die apparatus. In one of its aspects, the invention relates to a die frame assembly wherein improved guide means reciprocably support an ejector assembly for ejecting molded parts from a mold cavity.

2. State of the Prior Art

In injection molding equipment, die frame assemblies have means for ejecting the molded parts from a movable mold half as the mold is moved away from a stationary mold half. A movable ejector assembly is mounted reciprocably on the movable die frame and includes ejector pins which extend through the mold half. The movable ejector assembly also includes return pins which extend through the die frame to return the ejector assembly to retracted position upon closing of the mold. Holes in the frame and the die and the pins must be made with great precision to avoid binding of the pins or undue friction of the pins during movement of the ejector assembly. Nevertheless, even with close tolerances, some binding and wearing of the holes and pins occur. The wearing and binding introduce looseness or "slop" of the ejector assembly within the die frame, thereby causing accelerated wear and binding of the ejector assembly in the frame. Continued wear and binding can cause premature failure of the die and/or breakage of the pins.

One solution to this problem has been to amount guide pins on the frame with the guide pins extending through the base or clamp plate of the die frame and through the ejector plate or master ejector plate in the ejector assembly. The master ejector assembly is thus guided on the guide pins. With the ejector assembly guided by the guide pins, excessive wear on the holes for the ejector and return pins is minimized.

The guide pin or leader pin, as it is known, is a significant improvement over using the holes in the frame and the mold to guide the ejector assembly. However, this guide system is still relatively expensive as it requires extensive precision machining to assure proper fit between the guide pins and the ejector assembly.

SUMMARY OF THE INVENTION

According to the invention, an improved guide system is provided by mounting the ejector assembly for sliding movement on a pair of pillar or support posts which extend rigidly between the base and a central section of the die assembly. Replaceable and lubricated bushings are secured to the ejector plate for snug fitting of the plate on the support posts. Preferably, two or more posts are provided and the ejector plate is guided on all of the posts. The support posts are of a relatively large diameter and thus provide a wide guide surface for the ejector plate. Desirably, the posts are hardened or case-hardened for long wearing.

Desirably, the posts contain a locating boss at the top thereof which insures positive engagement of the support posts with the sprue section.

BRIEF DESCRIPTION OF THE DRAWINGS

The invention will now be described with reference to the accompanying drawings in which.

DESCRIPTION OF THE PREFERRED EMBODIMENT

Figure 1:
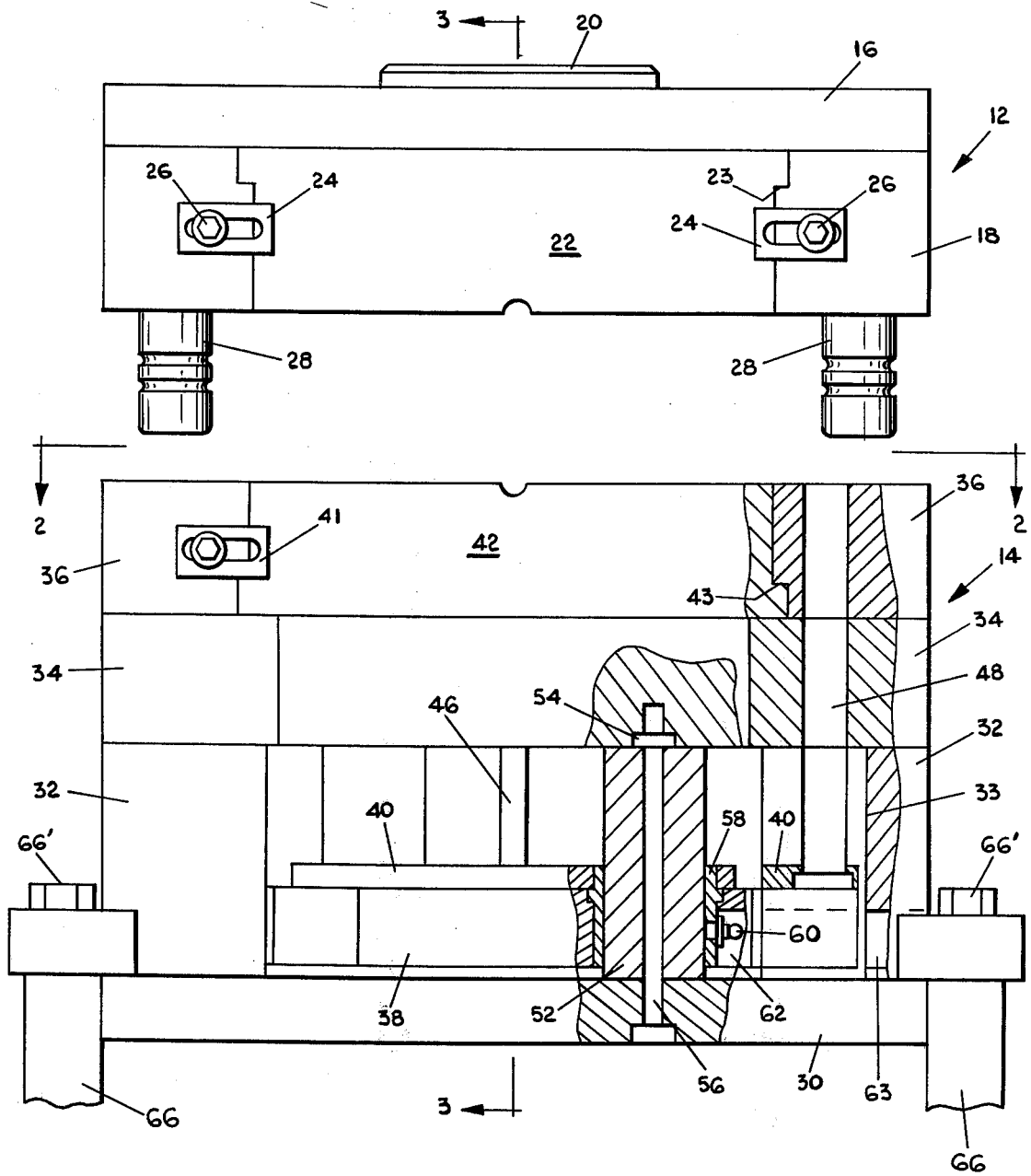
FIG. 1 is an end elevational view, partially in section, of a die frame construction according to the invention showing the frames in the open position.

Referring now to the drawings there is shown a stationary frame 12 and a movable frame 14. The frames are shown in an open position in FIG. 1 and are shown closed in FIG. 3. The stationary frame 12 has a clamp plate 16 and an H-shaped A rail plate 18 having rails 23. A sprue opening 20 extends through the clamp plate 16 and through the central portion of the A rail plate in conventional fashion. A pair of stationary mold halves 22 are retained within the opening in the H-shaped A rail 18 through the rails 23. Clamps 24 are retained on the ends of the A rail 18 through bolt 26 and extend toward the center thereof to retain the mold halves 22 within the A rail. Four leader pins 28 extend from the face of the A rail plate 18 and toward the movable frame 14.

The movable frame 14 comprises a clamp plate 30, ejector box rails 32, a support plate 34 and a B rail plate 36, all secured together in a unitary fashion. A plurality of bushed holes 37 are provided in the B rail plates to receive the leader pin 28 as the stationary and movable frames move together.

Figure 2:
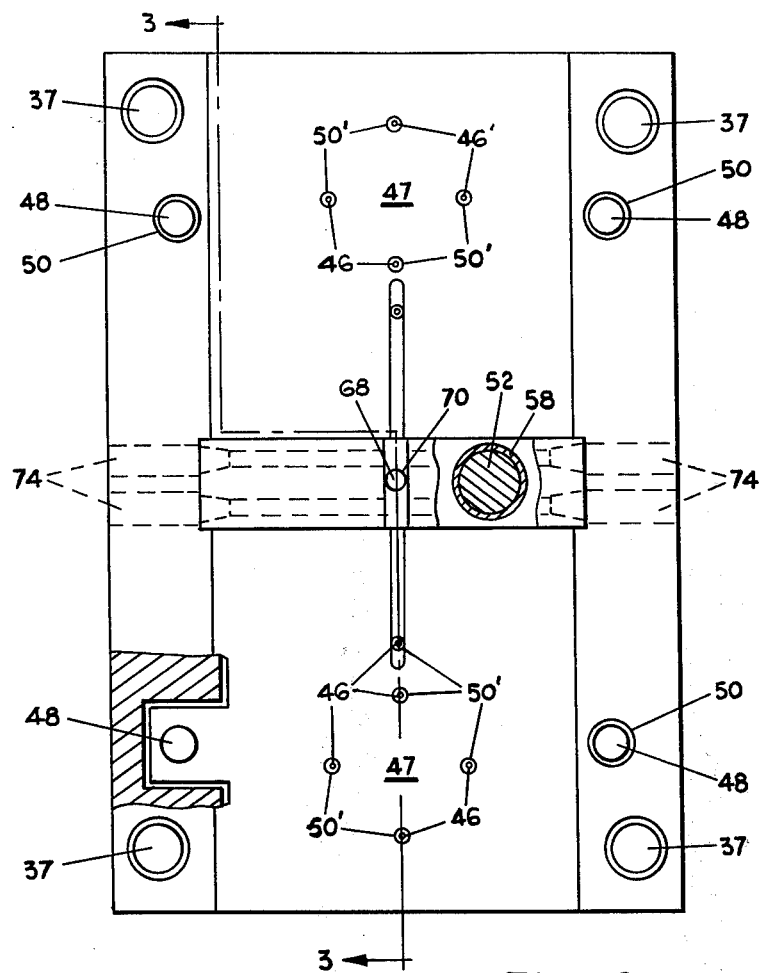
FIG. 2 is a plan view, partially broken away, of the bottom frame and viewed along lines 2—2 of FIG. 1.
Figure 3:
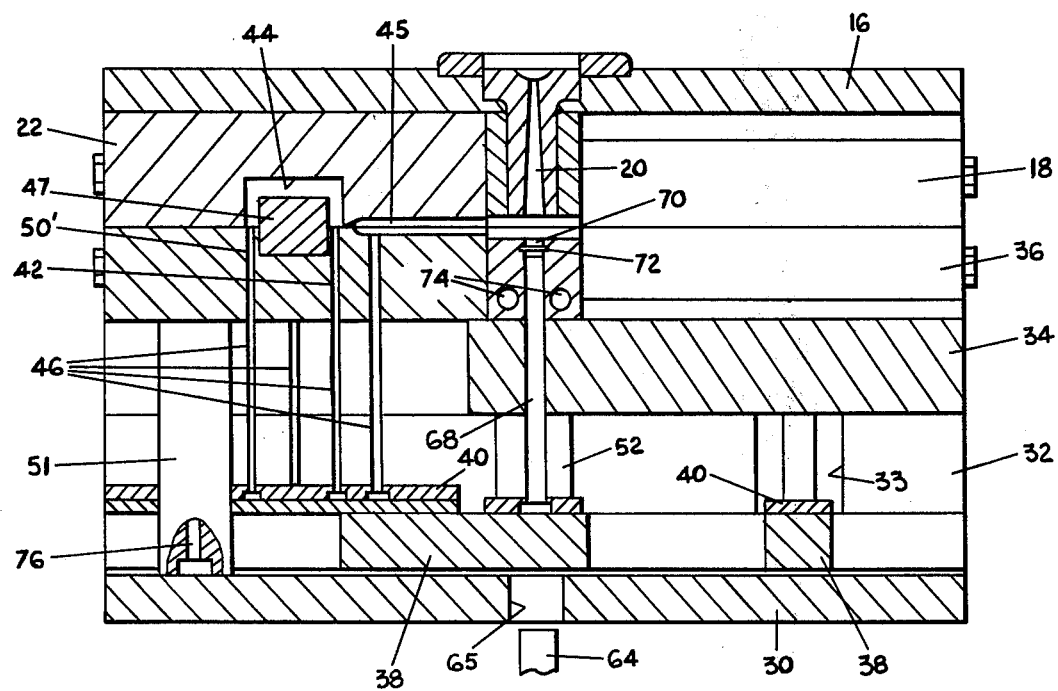
FIG. 3 is a sectional view taken along lines 3—3 of FIG. 1.

A pair of movable mold halves 22 are retained between the open areas of the H-shaped B rail plate 36 and on rails 43 by clamps 41. As seen in FIGS. 2 and 3, each mold half 22 may have a core 47 which projects into a cavity 44 of mold half 22. A runner cavity 45 extends from the sprue opening 20 to the cavity 44.

A master ejector plate 38 is provided between the ejector box rails 32 for reciprocal movement therebetween. A plurality of ejector pins 46 are seated on the master ejector plate and extend upwardly to the base of the runner cavity 45 and to the base of the cavity 44 in the mold halves 22 through holes 50' in the mold halves 42. Four return pins 48 are also seated on the master ejector plate 38 in cut out cavities 33 in the ejector box rail 32 and extend upwardly through holes in the support plate 34 and in the B rail plate 36 to the parting face thereof. A retainer plate 40 retains the lower portions of the ejector pins 46 and the return pins 48 in contact with the master ejector plate 38. To this end the return pins 48 and the ejector pins 46 have heads or flattened ends which fit into counter bores in the retainer plate 40.

A pair of hardened pillar or support posts 52 are secured to the clamp plate 30, extend through the master ejector plate 38, the retainer plate 40, and abut against the central portion of the support plate 34. The pillar posts are desirably made from steel which can be hardened or case-hardened as for example by nitriding, induction heating or other suitable metallurgical case-hardened techniques. A locating boss 54 at the top of the pillar posts 52 fits snugly within an opening of the same size in the support plate 34. The bosses 54 provide a locating function for the pillar posts 52 in assembling the frames. A threaded bolt 56 extends through the clamp plate and through each pillar post into a threaded opening in the support plate 34 to rigidly secure the pillar posts 52 between the clamp plate 30 and a sprue section formed by the central portion of the support plate 34 and the center of the B rail plate 36. A guide bushing 58 is secured to the master ejector plate 38 and snugly surrounds the hardened pillar posts 52 so that the master ejector plate 38 is guided by and rides on the pillar posts 52. The pillar posts 52 provide support for the central sections of the support plates 34 and the B rail plates 36 to counter the force of the injected material.

A grease zirk 60 is provided on the bushings 58 so that the bushings can be lubricated. A lateral bore 62 is provided in the master ejector plate 38 and a corresponding bore 63 is provided in the side of the ejector box rails 32 to permit insertion of the grease gun.

The guiding of the master ejector plate 38 on the pillar posts is a significant feature of the invention. It is very important that the master ejector plate be guided precisely and without slop so that the ejector pins 46 and return pins 48 do not bind in the holes 50' and 50 in the movable mold half 42. Sloppy movement of the ejector plate causes die wear in holes 50' and 50 and results in premature failure of the die. The lubricated guide bushings 58 provide a smooth guiding system for the master ejector plate so that the plate reciprocates smoothly between the clamp plate 30 and the support plate 34. Heretofore separate guide pins were provided on the mold through the clamp plate 30, through the master ejector plate 38 into the support plate 34 using the pins as a guide for ejector plate 34.

The guide bushings can be made of any suitable bushing material. Bronze, self-lubricating plastics, steel, ball bushings or pressed fiber bushings are suitable.

Additional pillar posts 51 are provided on each side of the master ejector plate in a cut out area thereof between the movable mold half 42 and the clamp plate 30. The pillar posts 51 support the outer end of the mold halves 42 and are secured thereto through a threaded rod 76.

A press knock-out rod 64 extends through openings 65 in the clamp plate 30 and abuts against the base of the ejector 38 as the movable frame 14 is drawn away from the stationary frame 12. The knock-out rod 64 is secured to an injection molding machine (not shown) and is conventional on such machines. Clamps 66 and screw 66' on the injection molding machine grip the sides of the clamp plate 30 to grip the movable frame 14 and move the same away from the stationary frame 18 in the operation of the injection molding machine in a conventional fashion.

A sprue puller pin 68 extends from the ejector plate through the central portion of the support plate 34 and through the central portion of the B rail plate 36 to an opening 70 having an undercut 72. If desirable, the molds can be cooled through suitable water lines 74.

In operation, the molds are closed as illustrated in FIG. 3, and plastic is injected into the sprue 20 under high pressure causing the plastic to flow through the runner cavity 45 and into the cavity 44. The force of the injected plastic in the sprue section is braced by the pillar posts 52. After a short period of time during which the plastic solidifies in the mold, the movable frame 14 moves rearwardly approximately to the position illustrated in FIG. 1. Due to the undercut 72 in the opening 70 and the shrinkage of the material onto core 47, the molded part will be retained in the movable mold halves 42. As the movable frame 14 continues to move away from the stationary frame 12, the ejector plate will come in contact with the press knock-out rods 64 thereby stopping the rearward movement of the ejector plate 38. However, the clamps 66 will continue to move away from the stationary frame 12, thereby drawing the clamp plates, ejector box rails, support plates, and B rail plate 36 (including the movable mold halves 42) still further away from the stationary frame 12. However, the sprue puller pin 68, as well as the ejector pins 46, will move forwardly with respect to the mold halves 42, thereby ejecting the part from the mold. In addition, the return pin 48 will be moved forwardly with respect to the surface of the B rail plate 36. During this movement of the ejector assembly with respect to the remainder of the movable frame, the hardened piller posts 52 serve as a guide and support for the master ejector plate 38.

After the part has been removed, the mold halves are pressed back together again, and the process starts anew. As the mold halves return to their closed positions, the return pins 48 will strike the surface of the A rail plate 18 and will force the pins back into the retracted position. During the return movement the master ejector plate will be guided and ride on the hardened pillar posts 52.

The guide provided by the hardened pillar posts 52 provides a simple and expedient means of guiding and supporting the master ejector plate in its reciprocatory movement with respect to the pillar posts 52. The pillar posts provide large bearing surfaces to maintain an adequate guiding surface for the ejector plate so that the ejector plate moves smoothly with respect to the remainder of the frame. Thus, the pillar posts serve the function of rigidifying or bracing the sprue section of the movable frame as well as providing the guiding surface for the ejector assembly. This dual function eliminates expensive guides which normally are provided through the clamp plate and the master ejector plate.

The case-hardened posts 52 are hard wearing due to the hardened surface. The guide bushings 58 are replaceable as they wear so that the guide system for the master ejector plate can be kept in good working order. The case-hardened pillar posts and the replaceable guide bushings 58 serve to lengthen the life of the die assembly.

Reasonable variation and modification are possible within the scope of the foregoing disclosure and drawings, without departing from the scope of the invention which is defined by the appended claims. For example, the sprue opening can be provided in either frame 12 or frame 14. Also, the mold halves and frames can be made integral instead of in separate parts for replacement of the mold halves. Further, the guide bushings 58 can be mounted on top of the master ejector plate instead of in the plate as shown. Other modifications will be suggested to those skilled in the art.

I claim:

1. In a die frame assembly for molding parts from heated fluid material, said die frame assembly comprising:
   a first frame including a first mold half;
   a second frame including a second mold half, said second frame including a clamp plate through which said frame is secured to a molding machine and a support plate spaced from said clamp plate;
   at least one of said first and second mold halves having a mold cavity forming a part to be molded;

at least one of said first and second mold halves having means passing the fluid molding material from a sprue opening to the mold cavity;

at least one support post extending between the clamp plate and the support plate to provide rigid support for the support plate;

an ejector plate mounted within the second frame with the support post extending through the ejector plate;

ejector pins mounted on the ejector plate and extending through the second mold half;

means mounting the ejector plate for reciprocatory movement within the second frame between a retracted position and an ejected position, the ejector pins being positioned at the surface of the mold cavity or the fluid material passing means when the ejector plate is in a retracted position, the ejector pins extending into the mold cavity or the fluid material passing means when the ejector plate is in the ejected position to eject the molded part from the second die half as the mold separates;

the improvement which comprises:

a bushing mounted to said ejector plate and snugly engaging said at least one support post to permit smooth guided movement of the ejector plate within the second die frame during ejection of the molded parts and return of the ejector plate to the retracted position, said ejector plate riding on and being guided within the second frame essentially only by said at least one support post.

2. A die frame assembly according to claim 1 wherein the bushing is removable from the ejector plate for replacement when the bushing becomes worn.

3. A die frame assembly according to claim 2 wherein means are provided on said bushing for lubricating the bushing.

4. A die frame assembly according to claim 3 wherein the support post has hardened outer surface for long wearing of the surface thereof.

5. A die frame assembly according to claim 4 wherein there are at least two hardened support posts and a guide bushing secured to the ejector plate surrounds each support post.

6. A die frame assembly according to claim 2 wherein the bushing is self lubricating.

7. A die frame assembly according to claim 6 wherein the support post has a hardened outer surface for long wearing of the surface thereof.

8. A die frame assembly according to claim 7 wherein there are at least two hardened support posts and a guide bushing surrounding each support post.

9. A die frame assembly according to claim 1 wherein the support post has a locating boss at the top thereof for positive engagement of the support post with the support plate.

* * * * *